United States Patent [19]

Inui

[11] Patent Number: 5,488,720
[45] Date of Patent: Jan. 30, 1996

[54] APPARATUS WITH DELETION SAFEGUARD FOR SETTING A NUMBER OF DATA IN TEMPORARY DELETION STATE AND INDEPENDENTLY RELEASING OR DELETING ANY ONE OF THE DATA

[75] Inventor: Kenichi Inui, Kitakatsuragi, Japan

[73] Assignee: Sharp Kabushiki Kaisha, Japan

[21] Appl. No.: 385,581

[22] Filed: Feb. 8, 1995

Related U.S. Application Data

[63] Continuation of Ser. No. 548,413, Jul. 5, 1990, abandoned.

[30] Foreign Application Priority Data

Jul. 7, 1989  [JP]  Japan .................. 1-176343

[51] Int. Cl.⁶ .................................. G06F 17/00
[52] U.S. Cl. .............. 395/600; 364/419.17; 364/705.06; 364/225.3; 364/225.8; 364/225; 364/231; 364/231.1; 364/DIG. 1
[58] Field of Search ................. 395/600, 800; 364/706, 419.17, 705.06

[56] References Cited

U.S. PATENT DOCUMENTS

| | | | |
|---|---|---|---|
| 3,585,601 | 6/1971 | Lahrson ................... | 395/700 |
| 4,445,195 | 4/1984 | Yamamoto ................ | 395/600 |
| 4,633,736 | 5/1987 | Furusawa et al. .......... | 395/600 |
| 4,807,111 | 2/1989 | Cohen et al. ............. | 395/250 |

(List continued on next page.)

FOREIGN PATENT DOCUMENTS

| | | |
|---|---|---|
| 61-20173 | 1/1986 | Japan . |
| 61-82227 | 4/1986 | Japan . |
| 61-260339 | 11/1986 | Japan . |
| 62-163153 | 7/1987 | Japan . |
| 63-86042 | 4/1988 | Japan . |
| 63-138442 | 6/1988 | Japan . |

OTHER PUBLICATIONS

Matthews et al, "Wordstar Professional: The Complete Reference", 1988, pp. 18 and 217–219.
Krasnoff et al, "Flat–File Databases: Project Database II", PC Magazine, vol. V5, Issue N13, Jul. 1986, pp. 187+.
Crider, "Wordperfect Power 5.0—The Complete Applications Reference", 1989, pp. XXiii, 13, 16.
MicroPro, "Wordstar 2000 Plus Release 3—Reference Guide", 1987, pp. 180, 181, 206, 207, 531.
Bican, "Mass–11 Word Processor", PC Magazine, vol. V7, Issue N4, Feb. 1988, pp. 209+.
Soloway et al, "Designing Documentation to Compensate for Delocalized Plans", Comm. of the ACM, vol. V31, Issue N11, Nov. 1988, pp. 1259+.
Sullivan, "Samna will Debut Major Revision of Its Word–Processing Software", PC Week, vol. V3, Issue N39, Sep. 1986, pp. 1+.
Gabel, "In a 'Word', Office Doors Open Wide to Evolving Graphical Applications", PC Week, vol. V5, Issue N3, Jan. 1988, pp. 98+.
Gordan, "Redlining Software Eases Document Comparisons, Good Tool for Multiple Authors", Telecommuting Review, vol. V5, Issue N1, Jan. 1988, pp. 6+.
Bryan, "Xy Quest Again Enhances Xy Write, Aims III Plus at Desktop–Publishing Market", Jul. 1987, PC Week, vol. V4, Isuue N27, pp. 77+.

Primary Examiner—Thomas G. Black
Assistant Examiner—Paul Harrity
Attorney, Agent, or Firm—Nixon & Vanderhye

[57] ABSTRACT

An improved small electronic apparatus such as an electronic organizer is disclosed. In the apparatus, data to be kept stored is prevented from being erroneously deleted. This apparatus comprises: a memory, a plurality of input keys; a temporary deletion element for, when a first predetermined key operation is performed, setting desired data which is stored in the memory into a temporary deletion state; a deletion element for, when a second predetermined key operation is performed, deleting the data which has been set into the temporary deletion state from the memory; and a release element for, when a third predetermined key operation is performed, releasing the temporary deletion state of the data which has been set into the temporary deletion state.

10 Claims, 4 Drawing Sheets

U.S. PATENT DOCUMENTS

| | | | |
|---|---|---|---|
| 4,807,182 | 2/1989 | Queen | 395/144 |
| 4,847,754 | 7/1989 | Obermarck et al. | 395/650 |
| 4,853,878 | 8/1989 | Brown | 395/145 |
| 5,109,508 | 4/1992 | Mitsumori et al. | 395/600 |
| 5,113,517 | 5/1992 | Beard et al. | 395/500 |
| 5,144,659 | 9/1992 | Jones | 380/4 |
| 5,261,080 | 11/1993 | Khoyi et al. | 395/500 |

FIG. 3A

| KEY OPERATION | DISPLAY |
|---|---|
| E  SEARCH | EDWARDS BOB<br>0745-31-1234 |
| DEL | ~~EDWARDS BOB~~<br>~~0745-31-1234~~ — 20 |

FIG. 3B

| KEY OPERATION | DISPLAY |
|---|---|
| E  SEARCH | ~~EDWARDS BOB~~<br>~~0745-31-1234~~ — 20 |
| DEL | JONES JACK<br>03-123-4567 |

FIG. 3C

| KEY OPERATION | DISPLAY |
|---|---|
| E  SEARCH | ~~EDWARDS BOB~~<br>~~0745-31-1234~~ — 20 |
| EDIT | ▨DWARDS BOB<br>0745-31-1234 |
| INPUT | EDWARDS BOB<br>0745-31-1234 |

APPARATUS WITH DELETION SAFEGUARD FOR SETTING A NUMBER OF DATA IN TEMPORARY DELETION STATE AND INDEPENDENTLY RELEASING OR DELETING ANY ONE OF THE DATA

This is a continuation of application Ser. No. 07/548,413, filed Jul. 5, 1990, now abandoned.

BACKGROUND OF THE INVENTION

1. Field of the Invention

This invention is related to an electronic apparatus, and more particularly to an electronic apparatus having a memory means such as an electronic organizer.

2. Description of the Prior Art

Compact electronic apparatus equipped with a memory means and a display means, and capable of storing data and displaying the recorded data using these means have come into wide use. Since these electronic apparatus are capable of recording telephone numbers, schedules and other data, they are expected to be used as a recording means for replacing the conventional paper pocket notebook. Below, as a typical example of such electronic apparatus, an electronic organizer will be described.

An electronic organizer is provided with keys including numeral keys and character keys. The user uses these keys to store schedules, telephone numbers, memos and other data in an internal memory. The data entered using the character keys can also be converted to kanji (chinese characters) using a kanji conversion function. Further, data stored in the memory can be displayed as desired by operating keys.

When deleting data stored in the memory, the data to be deleted (hereinafter, such data is referred to as "target data") is read from the memory to be displayed on a display device such as an LCD (Liquid Crystal Display), and then the delete key is pressed to delete the target data from the memory.

Since the storage capacity of the memory means is limited in an electronic organizer, unnecessary data must be deleted. Once data is deleted in an electronic organizer, it is completely erased, so in order to recover deleted data, it must be re-entered. When deleting data, therefore, the user must carefully determine that he is deleting the data which is really unnecessary, in order to avoid accidentally deleting necessary data. This kind of problem in data deletion detracts from the availability or usability of an electronic organizer.

SUMMARY OF THE INVENTION

The electronic apparatus of this invention, which overcomes the above-discussed and numerous other disadvantages and deficiencies of the prior art, comprises a memory means and a plurality of input keys, and further comprises: a temporary deletion means for, when a first predetermined key operation is performed, setting desired data which is stored in said memory means into a temporary deletion state; a deletion means for, when a second predetermined key operation is performed, deleting said data which has been set into the temporary deletion state from said memory means; and a release means for, when a third predetermined key operation is performed, releasing the temporary deletion state of said data which has been set into the temporary deletion state.

In an embodiment, said memory means comprises a plurality of data fields and temporary deletion fields, said temporary deletion field corresponding to data fields, respectively, said temporary deletion means writes information in the temporary deletion field which corresponds to one of said data fields which stores data to be set to the temporary deletion state, said information being indicative that data stored in said data field corresponding to said temporary deletion field is in the temporary deletion state, and said release means rewrites information stored in the temporary deletion field to other information, said temporary deletion field corresponding to one of said data fields which stores data to be released from the temporary deletion state, said other information being indicative that said data stored in said corresponding data field is not in the temporary deletion state.

In another embodiment, said deletion means deletes data stored in data fields which correspond respectively to temporary deletion fields storing said other information.

In a further embodiment, said apparatus further comprises: a display device; a display means for reading desired data from said memory means and displaying said desired data on said display device; and a temporary deletion means for, when a first predetermined key operation is performed, setting data which is displayed on said display means to a temporary deletion state.

In the above-mentioned construction, said apparatus further may comprise a marking means for, when data set to the temporary deletion state is displayed on said display device, displaying one or more marks together with the data displayed on said display device, said one or more marks being indicative that displayed data is in the temporary deletion state.

Alternatively, said memory means comprises a plurality of data fields and temporary deletion fields, said temporary deletion fields corresponding to data fields, respectively, said temporary deletion means writes information in the temporary deletion field which corresponds to one of said data fields which stores data to be set to the temporary deletion state, said information being indicative that data stored in said data field corresponding to said temporary deletion field is in the temporary deletion state, and said release means rewrites information stored in the temporary deletion field to other information, said temporary deletion field corresponding to one of said data fields which stores data to be released from the temporary deletion state, said other information being indicative that said data stored in said corresponding data field is not in the temporary deletion state.

In a further embodiment, said deletion means deletes data stored in data fields which correspond respectively to temporary deletion fields storing said other information.

Thus, the invention described herein makes possible the objectives of:

(1) providing an electronic apparatus in which the user can delete target data with peace of mind; and (2) providing an electronic apparatus in which target data can be temporarily deleted, and thereafter the user can decide to delete or to retain the target data.

BRIEF DESCRIPTION OF THE DRAWINGS

This invention may be better understood and its numerous objects and advantages will become apparent to those skilled in the art by reference to the accompanying drawings as follows:

FIGS. 3A, 3B, and 3C show the key operation sequences and the corresponding displays.

FIG. 5 is a front view of the embodiment.

DESCRIPTION OF THE PREFERRED EMBODIMENTS

Figure 4:
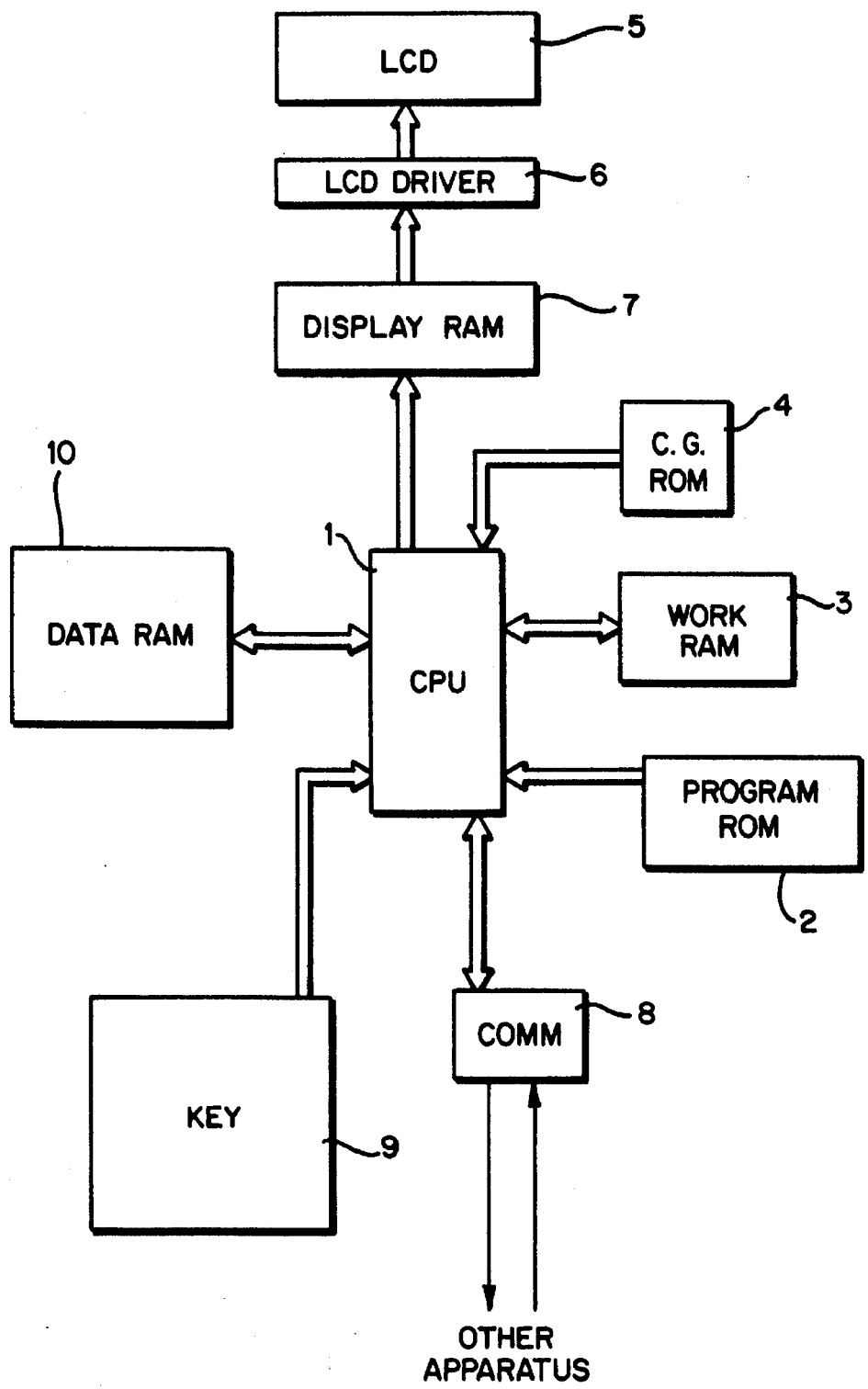
FIG. 4 is a block diagram of the embodiment.

FIG. 4 shows an electronic organizer according to the invention. The electronic organizer of FIG. 4 comprises a CPU 1, a program ROM 2, a work RAM 3, a C.G. ROM 4, and an LCD 5, an LCD driver 6, a display RAM 7, a communication unit 8, a key unit 9, and a data RAM 10. The CPU 1 controls the entire electronic organizer by executing the program stored in the program ROM 2. The work RAM 3 is a RAM used as the work area when the CPU 1 conducts the control process. The C.G. ROM 4 is a ROM in which character patterns for display are stored. The LCD driver 6 converts character patterns in the display RAM 7 into electric signals, and supplies them to the LCD 5. Each bit in the display RAM 7 corresponds to one pixel in the LCD 5. The communication unit 8 sends and receives data to and from other apparatus.

As shown in FIG. 5, the key unit 9 includes numeral keys 91, character keys 92 (alphabet, kana (Japanese characters), etc.), SEARCH keys 93, a delete (DEL) key 94, an EDIT key 95, a SPECIAL FUNCTION key 96, and an ENTER key 97.

Figure 1:
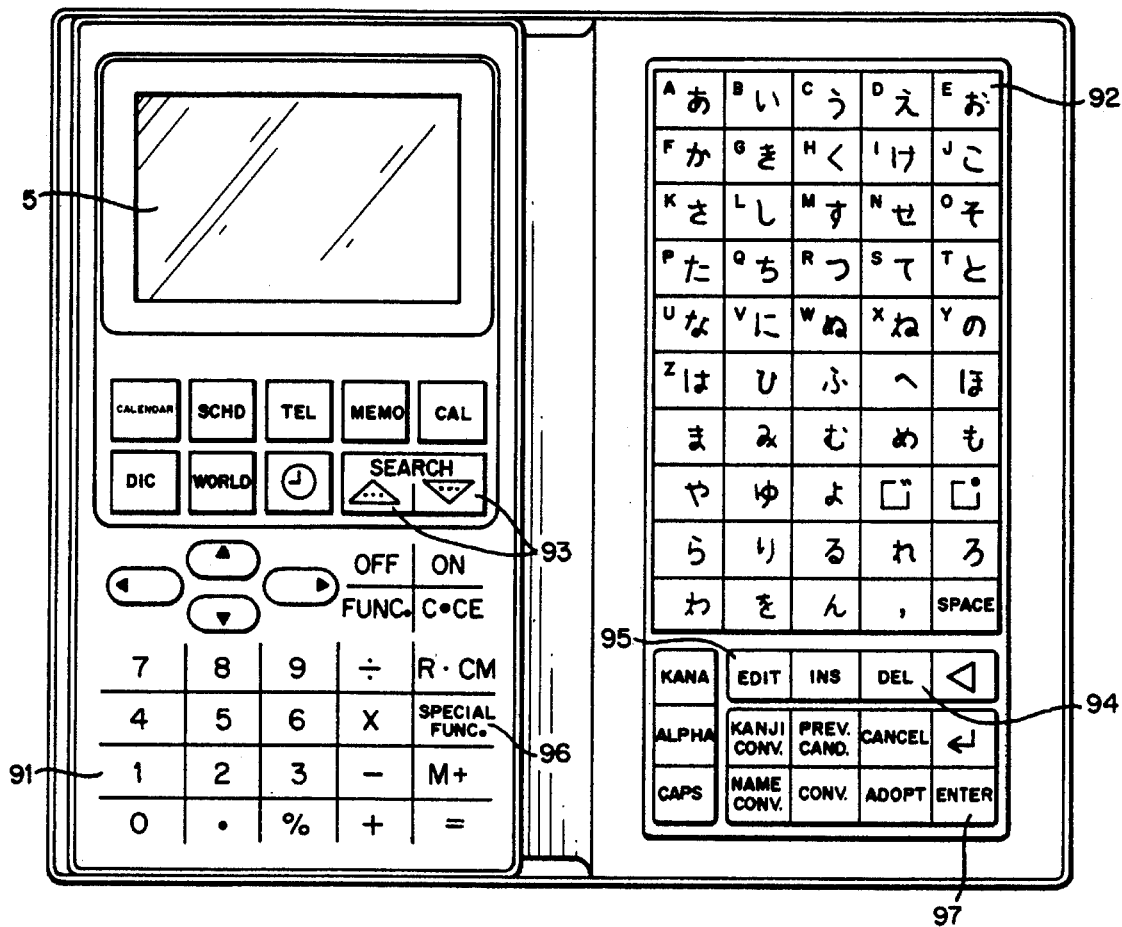
FIG. 1A shows diagrammatically the configuration of a memory means used in one embodiment of the invention.
FIG. 1B shows diagrammatically the contents of the memory means of FIG. 1A.

The configuration of the data RAM 10 is shown in FIG. 1A. The data RAM 10 has a plurality of data fields 11 and temporary deletion fields 12 which respectively correspond to the data fields 11. The data fields 11 store data, and the temporary deletion fields 12 store a special code or normal code. The temporary deletion fields 12 are used to distinguish whether or not the data in their corresponding data fields are in a temporarily deleted state (hereinafter, referred to as "temporary deletion state"). The temporary deletion state is an intermediate data state in which the data has not been actually deleted; i.e., the data has not been erased from the data RAM 10. The special code is indicative that data stored in the data field 11 corresponding to the temporary deletion field 12 storing the special code stores data which is set to the temporary deletion state. The normal code is a predetermined code which is other than the special code, and indicates that data stored in the data field 11 corresponding to the temporary deletion field 12 storing the normal code stores data which is not set to the temporary deletion state. The data field 11 can be either a fixed length or a variable length. In the case of variable length, the temporary deletion field 12 may be allocated to the delimiter area between data.

FIG. 1B shows the contents of the data RAM 10. In FIG. 1B, two units of telephone directory data (a person's name and telephone number) are respectively stored in first and second data fields 11. In this case, the first temporary deletion field 12 stores the special code, and therefore data stored in the first data field 11 is in the temporary deletion state. By contrast, data stored in the second data field 11 is not set to the temporary deletion state, and the second temporary deletion field 12 stores the normal code.

Figure 2:
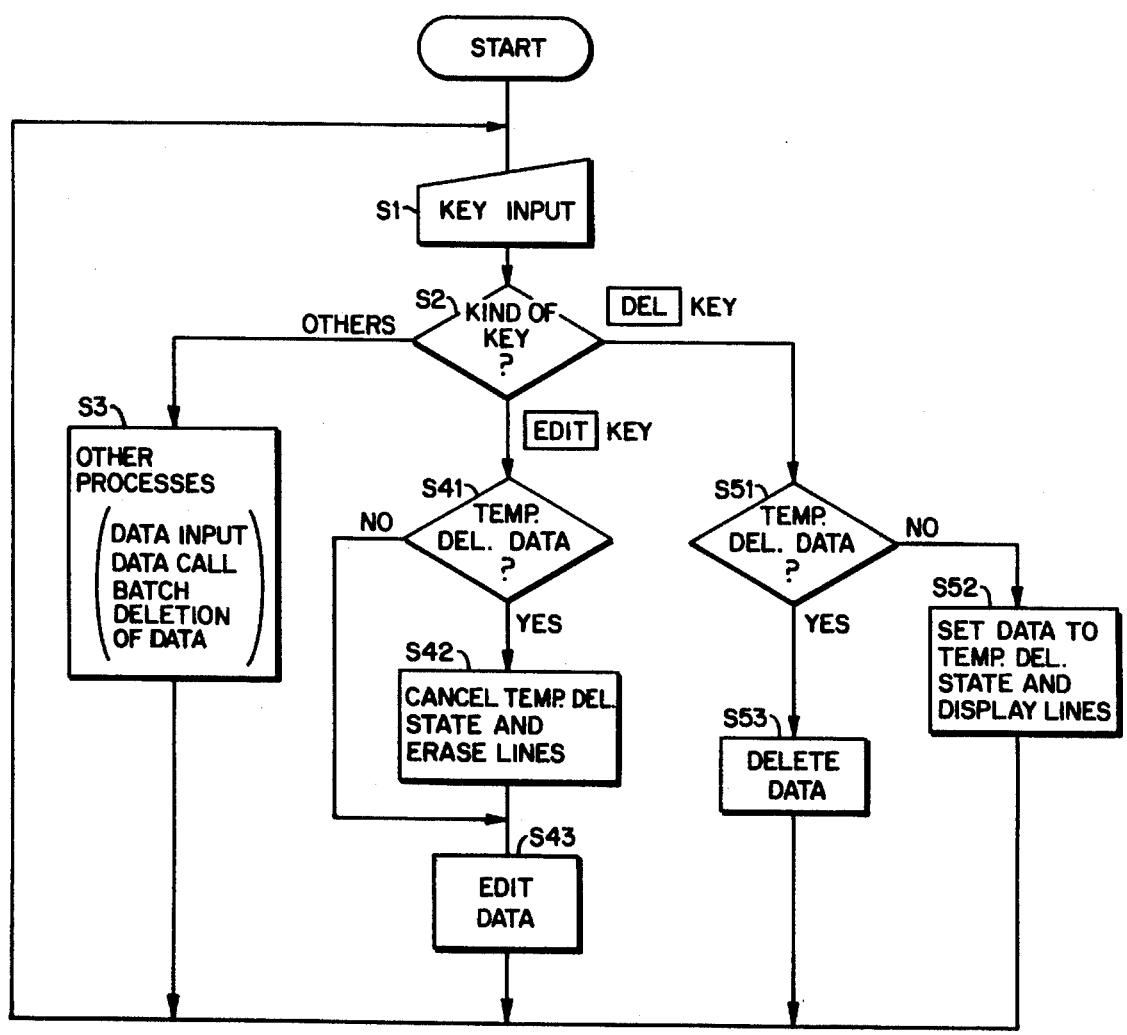
FIG. 2 is a flowchart illustrating the operation of the embodiment.

The operation of the embodiment will be described with reference to FIG. 2. When any key is pressed in step S1, the kind of pressed key is discriminated in step S2. When a key other than the DEL key 94 or EDIT key 95 is pressed, the process corresponding to the key pressed in step S1 is executed in step S3. For example, if one of the SEARCH keys 93 is pressed in step S1, the data is read out from the storage means in step S3 and displayed on the LCD 5 this process is referred to as "call").

(A) Setting of the Temporary Deletion State

When the DEL key 94 is pressed in step S1 after data has been called, the temporary deletion field 12 corresponding to the data field 11 storing that data is checked in step S51 to determine whether or not that the data is in the temporary deletion state (i.e., whether or not the temporary deletion field 12 stores the special code). If the data is not in the temporary deletion state (the temporary deletion field 12 stores the normal code), the process proceeds to step S52 in which the data is set to the temporary deletion state (i.e., the special code is stored in the corresponding temporary deletion field 12), and horizontal lines 20 are displayed over the data displayed in the LCD 5 as shown in FIG. 3A to indicate that the data has been set to the temporary deletion state. The key operation for setting data to the temporary deletion state and the display of the LCD 5 corresponding to the key operation are shown in FIG. 3A. The key operation shown in FIG. 3A causes the data RAM 10 to attain the state shown in FIG. 1B.

In this embodiment, the same key (the DEL key 94) is used for setting data to the temporary deletion state and also for actually deleting data which is the temporary deletion state. The present invention is not limited to this configuration.

(B) Cancel of the Temporary Deletion State

When the EDIT key 95 is pressed in step S1 after data has been called, the temporary deletion field 12 corresponding to the data field 11 storing that data is checked in step S41 to determine whether or not that the data is in the temporary deletion state. If the data is in the temporary deletion state (i.e., the corresponding temporary deletion field 12 stores the special code), the contents of the corresponding temporary deletion field 12 are rewritten (from the special code to the normal code), and the temporary deletion state of the data is canceled (step S42). The horizontal lines 20 over the data in the LCD 5 are erased. The data edit mode is automatically set after the temporary deletion state of the data is canceled (step S43). When the present data is to be retained in the data RAM 10, the ENTER key 97 is then pressed. When the called data is not in the temporary deletion state, the process jumps step S42 to advance from step S41 to step S43. An example of key operations used in this embodiment to cancel the temporary deletion state of data and retain the data, and an example of the corresponding display are shown in FIG. 3C.

As described above, in the electronic organizer of this embodiment, target data or data considered unnecessary can be tentatively set to the temporary deletion state, and after a certain period has elapsed, data which is truly unnecessary can be confirmed and deleted. Therefore, the danger of accidentally deleting data that are really necessary, which may occur in a prior art electronic apparatus, is avoided.

Alternatively, the process may proceed to step S1 after the temporary deletion state is canceled in step S42. In this case, it is preferable to provide a key for canceling the temporary deletion state which key is separate from the EDIT key.

The electronic organizer may be designed so that the combined key operation of the SPECIAL FUNCTION key 96 and another key causes the batch deletion of all data which are in the temporary deletion state.

It may be possible to dispose old data including temporarily deleted data by transferring them to an external storage device connected to the electronic organizer through the communication unit 8.

According to the invention, stored data considered to be unnecessary can be tentatively deleted, and then the decision to actually delete the data or recover it can be made later. The electronic apparatus of this invention has the utility of a paper notebook not found in prior art electronic apparatus, so it can be used with the same peace of mind as a paper notebook. An operator using the electronic apparatus of this invention can avoid the danger of accidentally deleting necessary data.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An electronic apparatus comprising a display, control means, and memory means under the control of the control means, the control means being responsively connected to a plurality of input keys, wherein said control means comprises:

temporary deletion means, responsive to a first predetermined key operation, for independently setting any number of desired data which are stored in said memory means into a temporary deletion state at any one time;

deletion means, responsive to a second predetermined key operation, for independently deleting any one of said desired data which have been set into the temporary deletion state from said memory means while maintaining other desired data in the temporary deletion state;

temporary deletion indication means for providing a visual indication, to be displayed with said desired data when any one of said desired data is displayed on the display, which indicates that said desired data is in the temporary deletion state; and release means, responsive to a third predetermined key operation, for independently releasing the temporary deletion state of any number of said desired data which have been set into the temporary deletion state while maintaining other desired data in the temporary deletion state.

2. The apparatus according to claim 1, wherein said memory means comprises a plurality of data fields and a temporary deletion field corresponding to each data field, wherein said temporary deletion means writes information in a selected one of the temporary deletion fields, said information being indicative that data stored in said data field corresponding to said selected one of the temporary deletion fields is in the temporary deletion state, and wherein said release means rewrites information stored in the selected one of the temporary deletion fields to other information, said other information being indicative that said data stored in said data field corresponding to said selected one of the temporary deletion fields is not in the temporary deletion state.

3. The apparatus according to claim 2, wherein said deletion means deletes data stored in data fields which correspond respectively to temporary deletion fields storing said information.

4. The apparatus according to claim 1, wherein said display is connected to the memory means, for reading desired data from said memory means and displaying said desired data.

5. The apparatus according to claim 1, wherein said deletion means deletes data stored in data fields which correspond respectively to temporary deletion fields storing information, said information being indicative that said data stored in one of said data fields corresponding to said selected temporary deletion fields is in the temporary deletion state.

6. The apparatus according to claim 1, wherein said data is completely deleted by said deletion means responsive to said second predetermined key operation.

7. The apparatus according to claim 6, wherein said first predetermined key operation and said second predetermined key operation are conducted using the same key, said same key being a key which has a delete function.

8. The apparatus according to claim 1, wherein said data which has been set into the temporary deletion state is stored in said memory means until said data is deleted by said deletion means.

9. An electronic apparatus according to claim 1, wherein said electronic apparatus is an electronic organizer.

10. An electronic apparatus comprising a display, control means, memory means under the control of the control means, and a plurality of input keys, the control means being responsive to the operation of the input keys, wherein said control means comprises:

temporary deletion means, responsive to a first predetermined key operation, for identifying any number of desired data which are stored in said memory means as being in a temporary deletion state at any one time while permitting ordinary access for data not in a temporary deletion state to said desired data identified as being in a temporary deletion state from said memory means;

deletion means, responsive to a second predetermined key operation, for independently deleting any one of said desired data which have been identified as being in the temporary deletion state from said memory means while maintaining other desired data in the temporary deletion state; and release means, responsive to a third predetermined key operation, for independently releasing the identification of any number of said desired data as being in the temporary deletion state while maintaining other desired data in the temporary deletion state.

* * * * *